UNITED STATES PATENT OFFICE.

THOMAS TAYLOR, OF WASHINGTON, DISTRICT OF COLUMBIA.

IMPROVEMENT IN REDUCING OXIDE OF LEAD.

Specification forming part of Letters Patent No. 56,635, dated July 24, 1866.

*To all whom it may concern:*

Be it known that I, THOMAS TAYLOR, of the city and county of Washington, in the District of Columbia, have invented a new and Improved Method or Process of Reducing Lead-Dross, such as lead-skimmings produced in the process of reducing crude lead or otherwise, of which the following is a specification.

To enable all skilled in the art to make and use my invention, I will proceed to describe it.

In the process of melting lead for any practical purpose the surface of the lead, if exposed to the atmosphere, becomes of a grayish-blue color, and is suboxide of lead, and consists of two parts or equivalents of lead to one of oxygen, $Pb_2O$; but if subjected to a still greater heat it will absorb more oxygen, and becomes protoxide of lead—in other words, it will consist of lead and oxygen in equal proportions, $PbO$. If the protoxide is subjected to a red heat, it will become semi-fluid, and is known in commerce as "litharge." (See "Napier's Chemistry on Dyeing," p. 196.)

In the various arsenals, navy-yards, and workshops of the United States a large amount of lead-dross is produced, consisting of pure lead combined with various degrees of oxidized lead. It is sometimes desirable to reduce the dross to the metallic state. The usual mode is to combine the dross with carbonaceous matter and submit the mass to high heat. Charcoal, as is well known, absorbs the oxygen more or less from the dross and liberates the lead; but in this process there is still a great waste.

In reducing with sawdust I have observed that portions of the dross would pass through the various degrees of oxidization—viz., from the suboxide to the higher stages of oxidization—and when the heat was above a red heat the yellow oxide would melt into glass. Sometimes a small globule would be observed in the fluxing oxide. This latter fact led me to try the effect of submitting the lead-skimmings to a high heat, sufficient to flux all the protoxide, so that any metallic lead combined with the flux would fall through it to the bottom. This experiment proved highly successful, and a larger amount of pure lead was obtained than by the charcoal process, and in a shorter space of time. I further observed that red oxide of lead, (minium,) commonly called "red lead," which is generally present more or less in lead-dross, became, when very highly heated, protoxide of lead, (litharge)—in other words, it gave off pure oxygen (see "Johnston Turner's Chemistry," p. 301, par. 751) and fluxed; but, further, when I fluxed the protoxide thus produced in an iron ladle, (wrought-iron,) and without any admixture of carbonaceous matter, the protoxide became partially reduced, but the iron of the ladle became consumed—in other words, the oxygen of a portion of the protoxide combined with the iron and liberated lead. Subsequently I fluxed litharge with iron filings with the same results. With cast-iron turnings the experiment was not so successful as might be expected, owing to the presence of silica and impurities which would unite readily with the lead flux and form glass; nor have my experiments been so successful in endeavoring to reduce the yellow oxide in cast-iron pots.

I am aware that iron has been used in the reduction of lead ore, with the view of combining with the sulphur when present; but I am not aware that iron has ever been used to reduce the oxide of lead to the metallic state—that is, as a deoxidizer.

With these explanations I shall now proceed to explain my process of reducing lead-dross skimmings, &c.

Into an iron pot I place the lead-dross or skimmings of lead and cover the mass with a sheet of waste iron, and subject the dross to a temperature of about from 700° to 800° of heat. The litharge present is fluxed. The metallic lead falls to the bottom, while the suboxide is converted into protoxide by absorbing oxygen, and is in turn fluxed. The red lead, if present, gives off pure oxygen and becomes protoxide, and is in turn fluxed. The flux in turn becomes decomposed. Its oxygen combines with the thin sheet-iron, forming a rust of iron and liberating pure lead.

When sulphur is present, as is sometimes the case when balls from broken cartridges are used, I mix a little lime with the flux in small portions, which combines with the sulphur, forming sulphuret of calcium; but, as a general rule, I have not found lime necessary by the above-described process.

Having thus described my invention, what I claim as new, and desire to secure by Letters Patent of the United States, is—

1. The use of protoxide of lead as a flux in the reduction of lead-dross, substantially for the purpose and in the manner herein set forth.

2. The use of iron as a deoxidizer of the protoxide of lead, substantially for the purpose and in the manner herein set forth.

THOMAS TAYLOR.

Witnesses:
   JNO. S. HOLLINGSHEAD,
   S. S. FAHNESTOCK.